April 29, 1941.  S. J. ERRETT  2,239,885
CUTTING AND WELDING TORCH
Filed Aug. 22, 1938
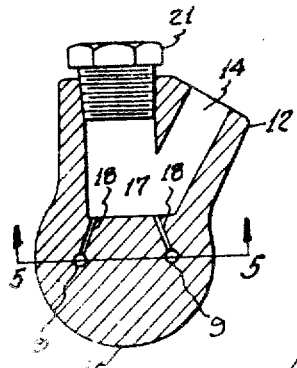
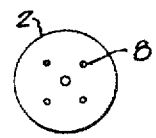
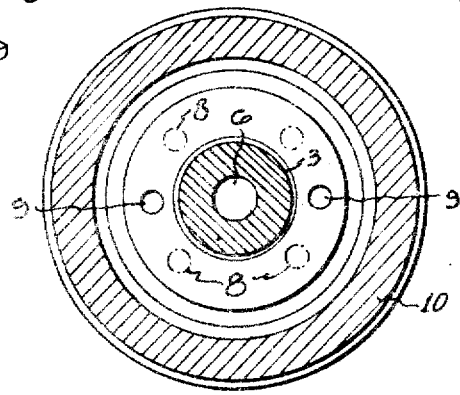
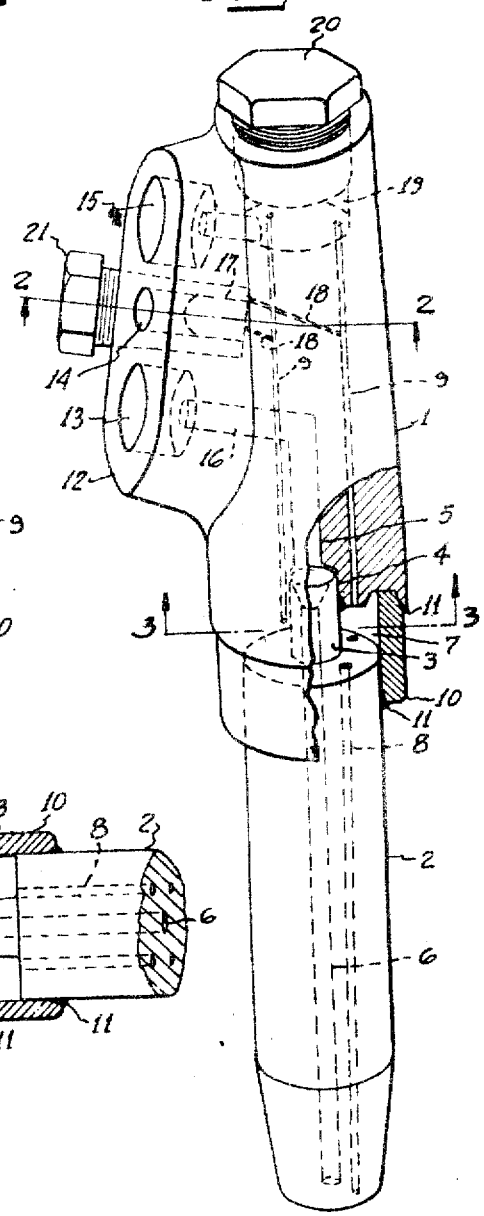
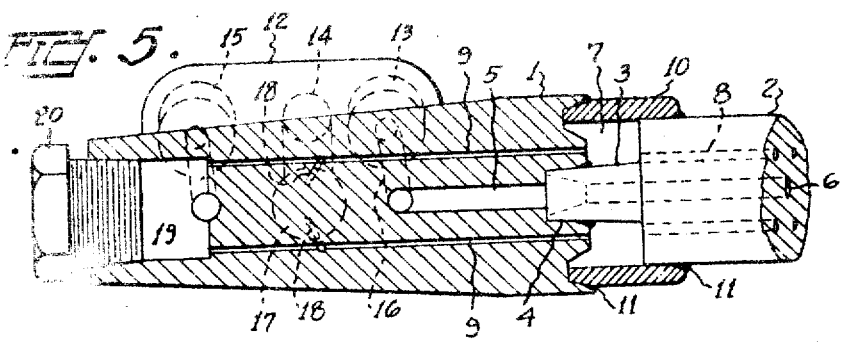
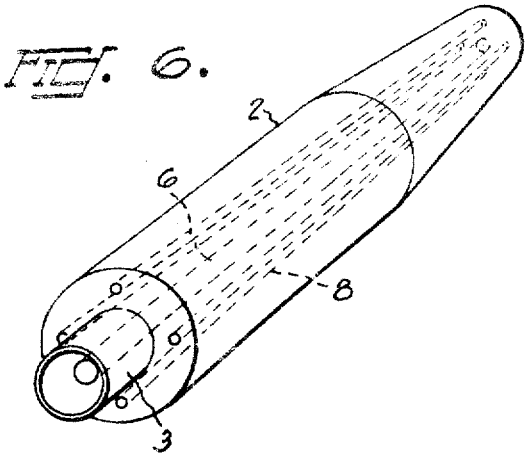
INVENTOR
SANFORD J. ERRETT
BY
ATTORNEY Patented Apr. 29, 1941

2,239,885

UNITED STATES PATENT OFFICE 2,239,885

CUTTING AND WELDING TORCH

Sanford J. Errett, Portland, Oreg.

Application August 22, 1938, Serial No. 226,103

5 Claims. (Cl. 158—27.4)

This invention relates to improvements in oxy-acetylene or oxyhydrogen cutting and welding torches, and has particular reference to an improved torch head, and to a new and improved means for preventing combustible mixtures of oxygen and acetylene gases in the passages of the torch.

Primarily, it is an object of the invention to provide a construction for a cutting torch which precludes the intermixing of oxygen and acetylene gases to a point of combustibility within the passages of the torch.

It is also an object of the invention to provide a new and improved means for sealing the passages for the high pressure oxygen from the passages for the low pressure gases.

It is a further object of the invention to provide for sealing the passage for the high pressure oxygen from the passages for the low pressure gases by a seal which will compensate for expansion and/or contraction of the parts due to variations in temperature.

It is a further object of the invention to provide a torch head having chambers providing pockets for excess volumes of unmixed gases in the low pressure gas lines.

It is a further object of the invention to provide in a cutting torch a construction wherein the flow of high pressure oxygen serves to insulate the passages for the low pressure gases from the heat created by the torch flame.

It is a further object of the invention to provide means for cleaning the passages in a torch head without dismantling the torch.

To the accomplishment of the recited objects and others coordinate therewith, the preferred embodiment of the invention resides in the construction and arrangement of parts hereinafter described, illustrated in the accompanying drawing, and embraced within the scope of the appended claims.

In the drawing:

Figure 1 is a side elevation, partly in section, of a torch head and cutting tip embodying the principles of the present invention.

Figure 2 is a cross sectional elevation of the torch head, taken on the line 2—2 of Figure 1.

Figure 3 is an enlarged section of the torch head taken on the line 3—3 of Figure 1.

Figure 4 is an end view of the cutting tip.

Figure 5 is a sectional elevation of the torch head taken on the line 5—5 of Figure 2.

Figure 6 is a perspective view of a cutting tip adapted for use with applicant's torch head.

The illustrated embodiment of the invention comprises a torch head 1 having a cutting tip 2 disposed in abutting relation with the forward end thereof. The tip shown is provided on its inner end with a central extension 3 which is designed to extend into a socket 4 provided in the end of the torch head. As is usual in torch construction, high pressure oxygen is conducted through a passage 5 extending longitudinally of the torch head at its center, and through a passage 6 disposed centrally of the tip. The passage 6 in the tip extends through the extension 3 and is caused to register with the passage 5 in the torch head when the extension 3 is inserted into the socket 4. An annular chamber 7 is formed about the extension 3 between the inner end of the tip and the end of the torch head, from which chamber a plurality of passages 8 lead to the end of the tip. Low pressure oxygen and acetylene or other suitable fuel gases are conducted to the chamber 7 through passages 9—9 in the torch head, the chamber 7 providing a means whereby these gases may be more intimately mixed during their passage through the tip. A ferrule 10 covers the inner end of the tip 2 and forms the outer wall of the chamber 7.

Applicant seals the flow of high pressure oxygen from the mixture of low pressure gases in the chamber 7 by brazing the extension 3 of the tip into the socket 4. In the construction illustrated, the juncture of the tip extension 3 and the socket 4 is the only joint within the torch at which leakage of the high pressure gases might occur, and applicant precludes such leakage by brazing this joint. An advantage of this construction resides in the fact that a brazed joint will wholly compensate for expansion or contraction of the parts due to variations in temperature, such as may occur when the torch becomes heated, as when used for cutting bolts and rivets on marine work and the like. On the other hand, a joint which is dependent upon screw threads to maintain a seal will loosen when the torch becomes heated, and the consequent admixture of gases which results from leakage of oxygen from the high pressure line into the mixing chamber for the low pressure gases, will cause the flame to strike back along the gas passages of the torch, resulting in dangerous explosions therewithin.

In addition to brazing the tip to the torch head in such manner as to provide a brazed seal between the flow of high pressure oxygen and the mixing chamber for the low pressure gases, the tip also is fastened to the torch head by the brazed joints 11—11 which secure one end of the ferrule 10 to the tip and the other end of the ferrule to the torch head. These brazed joints form impermeable seals to preclude leakage of the mixed gases from the chamber 7 to the atmosphere. The tip may be removed from the torch head by heating the brazed joints sufficiently to melt the solder.

The torch head 1 comprises a cylindrical body wherein is embodied the respective passages through which the separate gases are conducted to the tip 2. A boss or shank 12 on the torch head serves as a connecting means for the gas supply lines (not shown) which are insertible into the shank 12 in registration with, respectively, the intake port 13 for the high pressure oxygen, the intake port 14 for the acetylene or other fuel gas, and the intake port 15 for the low pressure oxygen. The inlet port 13 for the high pressure oxygen terminates in a lateral passage 16 which communicates with the passage 5 disposed in the longitudinal center of the torch head. The inlet port 14 for the fuel gas terminates in a chamber 17 from which a plurality of minute passages 18 extend laterally of the torch head and communicate with the longitudinal passages 9—9 which lead into the mixing chamber 7. Each one of the passages 18 communicates with one of the longitudinal passages 9, so that each one of the longitudinal passages 9 is in communication with the chamber 17 through one passage 18. The inlet port 15 for the low pressure oxygen terminates in a chamber 19 formed in the rear end of the torch head, from which chamber 19 the passages 9—9 lead to the mixing chamber 7. While the drawing shows only two such passages, it will be appreciated that the disclosure thereof is more or less of a schematic nature and is not intended to imply a structural limitation. It is important, however, that each one of the longitudinal passages 9 be supplied with fuel gas by but one passage 18 communicating with the chamber 17.

In the above described arrangement of parts and passages, the initial mixture of the low pressure oxygen with the fuel gas takes place at each junction of passages 9 and 18. For the longitudinal passages 9 applicant uses drills not larger than number 54, and for the lateral passages 18 the drills are not larger than number 69. These respective drill sizes provide passages of such proportion that insufficient oxygen is admitted through the passage 9 to render combustible the fuel gas supplied through the communicating passage 18, and the mixture of gases conducted to the chamber 7 is not combustible. The gases are used at the pressures at which they are commonly marketed for use in cutting and welding torches. By reason of the fact that the passages 9—9 which discharge into the chamber 7 are not aligned with the passages 8 which lead to the end of the tip, a positive mixing of the low pressure gases takes place within the chamber before these gases are discharged from the tip. At the point of discharge from the end of the tip, the mixed gases take enough oxygen from the atmosphere to become wholly combustible.

A further factor of safety in applicant's construction is the provision of the chambers 17 and 19 from which the low pressure gases are conducted through the passages 9 and 18. Each of these chambers provides an excess volume of gas which acts as a cushion to resist the force of minor explosions which may occur near the end of the tip. Acetylene gas by itself is not inflammable, and unless a considerable quantity of oxygen should leak back through the passages 18 into the chamber 17, the pocket of acetylene gas in the chamber 17 would prevent the flame from striking back into the hose lines.

A particular advantage of applicant's construction lies in the fact that the inlet for the high pressure oxygen is between the tip and the inlet for the low pressure gases. The flow of oxygen through the passages 16 and 5 tends to insulate the remainder of the torch head from the heat generated by the flame at the end of the tip, and so tends to keep the low pressure gases cool and prevents back-firing.

The torch head illustrated in the drawing is so constructed that the respective passages for the flow of gas therethrough are made available for cleaning purposes without removing the tip from the head or disconnecting the hose lines. The chamber 19 for the low pressure oxygen is closed by a tapered plug 20, and upon removal of the plug 20 cleaning elements can be inserted into the passages 9—9 to remove any obstructions therein. The chamber 17 for the fuel gas is closed by a tapered plug 21 threaded into one side of the boss or shank 12. Upon removal of the plug 21 the passages 18 may be cleaned by use of a suitable cleaning rod. In this connection it should be stated that at the time the extension 3 of the tip 2 is brazed into the socket 4, the adjacent ends of the passages 9—9 are plugged with carbon to prevent the brazing solder from closing these passages. After the joint is brazed, the carbon is removed by running a cleaning rod through these passages from the opposite end of the torch head.

A torch employing the construction and embodying the principles of the hereinbefore described invention may be used with any one of the fuel gases commonly used for cutting and welding, and wherever applicant has used the term "acetylene" it is intended to embrace all such gases.

Having now described my invention and in what manner the same may be used, what I claim as new and desire to protect by Letters Patent is:

1. In a cutting torch, a torch head and a cutting tip therefor, said torch head being provided with an outer end socket, the tip being provided with an extension designed to extend into said socket, an annular chamber formed about the extension and disposed between the end of the torch head and the end of the tip, a ferrule disposed over the inner end of the tip and forming the outer wall of said chamber, a passage in said torch head opening into said socket, a passage in said tip extending through said extension and registering with said passage in the torch head, and passages in said torch head and said tip opening into and leading from said chamber, said extension being brazed into said socket to seal the flow of gas therethrough from said chamber.

2. A torch head for welding and cutting torches and a cutting tip therefor, a passage in said torch head, a passage in said tip registering with the passage in the torch head, a brazed seal for sealing the juncture of said passages, a chamber disposed between the inner end of the tip and the end of the torch head, a ferrule over the inner end of the tip and forming the outer wall of said chamber, and brazed seals for securing said ferrule and sealing said chamber.

3. A torch head for welding and cutting torches, open at both ends, having a plurality of passages therethrough for conducting the separate gases to the tip, a chamber disposed in one end of said torch head, certain ones of said passages extending longitudinally through said torch head and communicating with said chamber, a second chamber intermediate the ends of said torch head, certain ones of said passages extending transversely of said torch head and providing communication between said second chamber and said first named passages, and closure members for said chambers so constructed and arranged as to make said passages available for cleaning purposes without removing the tip or disconnecting the supply lines from said torch head.

4. A torch head for welding and cutting torches, open at both ends, and having a plurality of passages therethrough for conducting the separate gases to the tip, a chamber disposed in one end of said torch head, certain ones of said passages extending longitudinally through said torch head and communicating with said chamber, a closure member for said chamber so constructed and arranged as to make said passages available for cleaning purposes without removing the tip or disconnecting the supply lines from said torch head.

5. A cutting torch, comprising a torch head and a cutting tip therefor, a socket in the outer end of said torch head, a central extension on the inner end of said tip, said extension being received in said socket and secured therein by means of a brazed seal, a chamber disposed between the inner end of the tip and the end of the torch head, and a ferrule disposed over the inner end of the tip and forming the outer wall of said chamber, one end of said ferrule being brazed to the tip and the other end being brazed to the torch head in such manner as to preclude leakage of gases from said chamber to the atmosphere.

SANFORD J. ERRETT.